Jan. 18, 1966 — W. SOBOTKA — 3,230,485
WAVE RETARDING STRUCTURE
Filed March 5, 1962
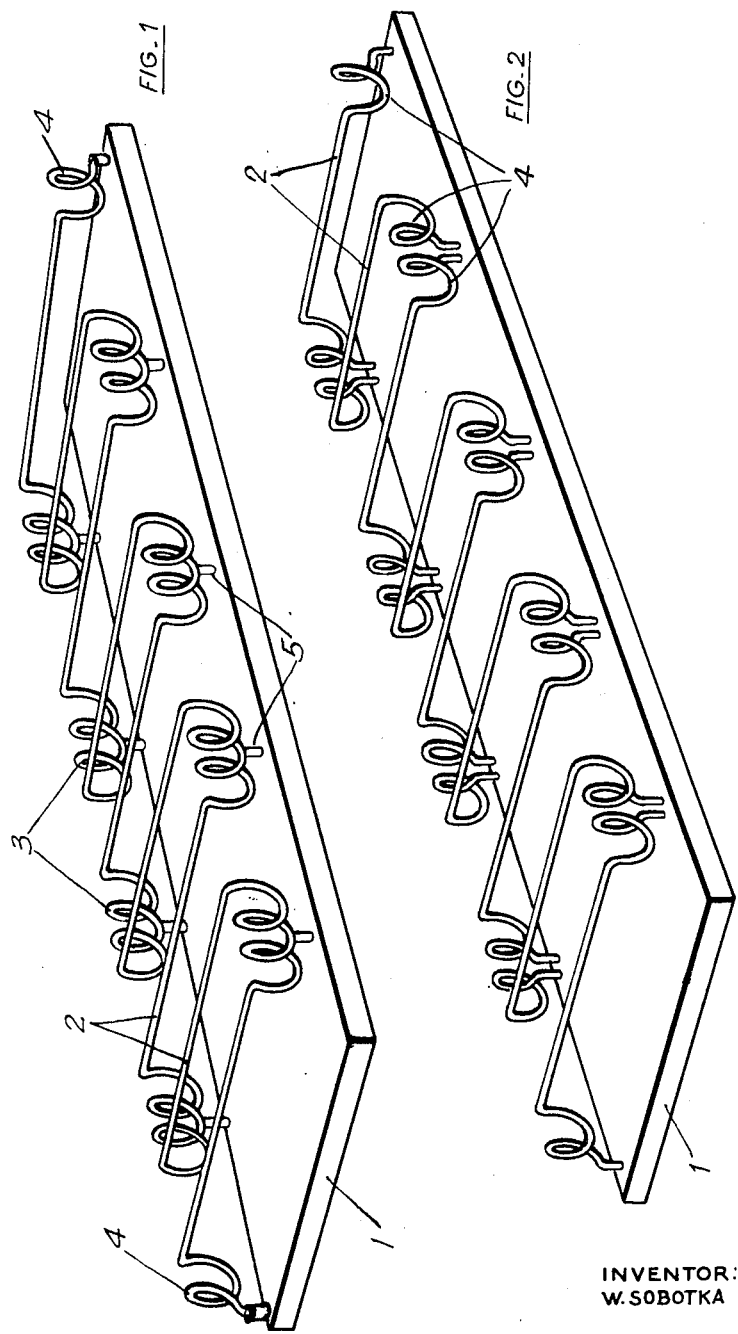
INVENTOR:
W. SOBOTKA
BY Paul M. Craig, Jr.
ATTORNEY United States Patent Office 3,230,485
Patented Jan. 18, 1966

3,230,485
WAVE RETARDING STRUCTURE
Walter Sobotka, Paris, France, assignor to CSF—Compagnie Generale de Telegraphie Sans Fil, Paris, France
Filed Mar. 5, 1962, Ser. No. 177,349
Claims priority, application France, Mar. 15, 1961, 855,669
2 Claims. (Cl. 333—31)

The present invention relates to improvements in wave retarding structures for travelling wave tubes, such as amplifiers and oscillators either of the forward or backward type which operate on frequencies below 400 megacycles per second.

The operation of travelling wave tubes is based, as is known, on the interchange of energy between an electron beam and an electromagnetic wave propagating along the delay structure.

The delay structures are characterized by elements disposed with a geometric periodicity forming filter cells.

The invention is concerned with delay structures embodying both elements with distributed constants or parameters and inductive lumped elements.

The known structures of wave delay circuits of this type entail the shortcoming of being difficult or rather inconvenient to cool the same by the circulation of a cooling fluid as is necessary in high-power tubes.

According to the present invention, the wave retarding structure comprises a conductive plate, a series of conductors disposed parallelly to each other and equidistanst to the same plate, and lumped inductances, and is characterized in that the said inductances are disposed in such a manner as to connect or couple an extremity of each conductor to the homologous extremity of the preceding conductor, and the other extremity of this conductor to that of the following conductor.

For high-power tubes, the conductors and inductances of the wave delay structure in accordance with the present invention are constituted entirely by hollow tubular members on the inside of which is circulated a cooling fluid. The wave retarding structure is then particularly remarkable due to the facility with which the cooling fluid may pass through the assembly of all the inductances and conductors.

Accordingly, it is an object of the present invention to provide a novel and improved wave retarding structure which obviates the aforementioned shortcomings and disadvantages encountered with the prior art structures and which, in particular, may be readily used and adapted to cooling by a cooling liquid.

It is another object of the present invention to provide a wave retarding structure which may be readily used with high-power electron discharge devices operating at frequencies below 400 megacycles per second.

Still another object of the present invention resides in the provision of a wave retarding structure in which the dimensions may be kept within reasonable limits notwithstanding operation of the tube at relatively lower frequencies, such as in the meter band.

These and other objects, features and advantages of the present invention will become more obvious from the following description when taken in connection with the accompanying drawing which shows, for purposes of illustration only, two embodiments in accordance with the present invention, and wherein FIGURE 1 is a prespective view of a first embodiment of a wave retarding structure in accordance with the present invention, and FIGURE 2 is a perspective view of a modified embodiment of a wave retarding structure in accordance with the present invention.

Referring now to the drawing wherein like reference numerals are used throughout the two views to designate like parts, and more particularly to FIGURE 1, the wave retarding structure illustrated therein comprises a conductive plate 1, a so-called "back-plate," and conductors 2 which are disposed parallelly to one another as well as parallelly to the plate 1. The conductors 2 are interconnected by means of inductances 3, one extremity of each conductor being connected to the adjacent extremity of the preceding conductor, and the other extremity of the same conductor being conducted to the adjacent extremity of the following conductor. Two inductances 4, each formed by one-half of an inductance 3 are disposed at the extremities of the circuit. The inductances 3 and 4 are secured to the back-plate by means of insulating supports 5.

The inductances 3 are illustrated herein as provided with three turns, however, it is understood that the number of turns may be varied at will depending on the particular requirements.

The wave retarding structure of FIGURE 1 presents a direct dispersion of small value and a large band-pass.

The circuit illustrated in FIGURE 2 comprises, as that of FIGURE 1, a back-plate 1 and conductors 2; however, in this embodiment the conductors 2 are connected to the back-plate 1 by means of inductances 4 disposed alternately on both sides of the conductors 2, a magnetic coupling being assured between adjacent inductances.

The magnetic coupling of the inductances 4 may be rendered either positive or negative depending on whether the inductances are wound in the same or opposite directions, the latter being the case in the illustrated embodiment of FIGURE 2.

It may be noted that if, in the circuit of FIGURE 1, the insulating supports 5 are removed and each inductance 3 cut into two halves connected to the backplate 1, a wave retarding circuit will be obtained equivalent to that of FIGURE 2 with a positive coupling.

For the high power tubes, the wave retarding circuits represented in FIGURES 1 and 2 are constituted by hollow tubes on the inside of which flows a cooling fluid.

It may be readily seen that in connection with the structure of FIGURE 1, it suffices to admit the coolant at one end of the structure and to discharge the coolant at the other end thereof in order that all of the elements thereof be properly cooled.

In the structure of FIGURE 2, the bars, terminated by inductances, lend themselves readily to individual cooling by reason of the fact that the structure does not include insulators.

While I have shown and described two embodiments in accordance with the present invention, it is understood that the same is not limited thereto, but is susceptible of many changes and modifications within the spirit and scope thereof as known to a person skilled in the art. For example, the present invention is not limited to the particular forms illustrated in FIGURES 1 and 2, and, in particular, to the rectilinear form thereof but is also applicable to circular wave retarding stuctures in which case the conductive plate and the conductors effectively form two concentric cylindrical surfaces.

Thus, it is obvious that the present invention is not limited to the two embodiments illustrated herein, but is susceptible of many changes and modifications without departing from the spirit and scope thereof, and I therefore do not wish to be limited to the details shown and described herein, but intend to cover all such changes and modifications as are encompassed by the scope of the appended claims.

I claim:
1. A wave delay structure comprising a conductive plate and a circuit including a sequence of N substantially parallel, rectilinear conductors of equal length, disposed is a plane parallel to said conductive plate, and a number 2N of lumped inductance elements connected respectively to the 2N ends of said N conductors, the inductance element connected to one end of a conductor being coupled to the inductance element which is connected to the adjacent end of the preceding conductor, while the inductance element connected to the other end of the same conductor is coupled to the inductance element which is connected to the following conductor.

2. A wave delay structure comprising a conductive plate and a circuit including a sequence of N substantially parallel, rectilinear conductors of equal length disposed in a plane parallel to said conductive plate, and a number 2N of lumped inductance elements connected respectively to the 2N ends of said N conductors, the inductance element connected to one end of a conductor being coupled to the inductance element which is connected to the adjacent end of the preceding conductor, while the inductance element connected to the other end of the same conductor is coupled to the inductance element which is connected to the following conductor, said conductors and inductance elements being made of hollow tubulares and being arranged to enable circulation of a coolant fluid therethrough.

References Cited by the Examiner

UNITED STATES PATENTS

| | | | |
|---|---|---|---|
| 2,809,320 | 10/1957 | Adler | 333—31 |
| 2,827,588 | 3/1958 | Guenard et al. | 333—31 |
| 2,890,384 | 6/1959 | Dench | 333—31 |
| 2,920,227 | 1/1960 | Dohler et al. | 333—31 |
| 2,939,035 | 5/1960 | Reverdin | 315—3.5 |
| 2,992,356 | 7/1961 | Paschke | 315—3.6 |

HERMAN KARL SAALBACH, *Primary Examiner.*